US012705449B2

(12) United States Patent
Perugini et al.

(10) Patent No.: US 12,705,449 B2
(45) Date of Patent: Aug. 11, 2026

(54) EVENT-BASED CODE LOCALIZER AND METHOD THEREOF EXECUTED BY A CODE READER

(71) Applicant: Datalogic IP Tech S.R.L., Calderara di Reno (IT)

(72) Inventors: Luca Perugini, Bologna (IT); Ali Abdurabu Abdulah Al-Erwi, Bologna (IT)

(73) Assignee: DATALOGIC IP TECH S.R.L., Calderara di Reno (IT)

( * ) Notice: Subject to any disclaimer, the term of this patent is extended or adjusted under 35 U.S.C. 154(b) by 0 days.

(21) Appl. No.: 18/828,995

(22) Filed: Sep. 9, 2024

(65) Prior Publication Data

US 2026/0073171 A1 Mar. 12, 2026

(51) Int. Cl.
*G06K 7/14* (2006.01)

(52) U.S. Cl.
CPC .................................. *G06K 7/1443* (2013.01)

(58) Field of Classification Search
CPC .................................................... G06K 7/1443
USPC ..................................................... 235/462.08
See application file for complete search history.

(56) References Cited

U.S. PATENT DOCUMENTS 8,326,037 B1 * 12/2012 Abitz .................. G06K 7/1443 382/101
12,141,652 B1 * 11/2024 Kotlarsky .............. G06V 10/82
12,217,552 B1 * 2/2025 Gammelgard ........ H04L 9/3236
2005/0274807 A1 * 12/2005 Barrus .................... G06F 16/58 707/E17.026
2011/0075931 A1 * 3/2011 Chiou .................. G06K 7/1465 382/190
2015/0294129 A1 * 10/2015 Aspert ................. G06K 7/1478 235/462.1
2018/0107999 A1 * 4/2018 Rizzolo ..................... G06T 7/73
2022/0147780 A1 * 5/2022 Kagotani ............. G02B 5/0284

* cited by examiner

*Primary Examiner* — Allyson N Tra
(74) *Attorney, Agent, or Firm* — Foley & Lardner LLP

(57) ABSTRACT

One embodiment of a method of identifying a linear barcode may include acquiring multiple events from an event-based camera imaging an object on which a linear barcode is positioned within the scene. The events may be grouped to form clusters of the events. A box may be formed around the linear barcode so as to identify a region-of-interest in which to process the linear barcode for decoding, thereby increasing speed for decoding the linear barcode as the code reader may focus on the region-of-interest within the box. In an embodiment, edges of features may be identified from the group events. Consecutive edges with the same or similar angle may be identified, thereby being indicative of the linear barcode.

20 Claims, 4 Drawing Sheets

EVENT-BASED CODE LOCALIZER AND METHOD THEREOF EXECUTED BY A CODE READER

BACKGROUND

Code readers are generally configured to be handheld, stationary, or a combination thereof. In the case of handheld code readers, a user typically moves the handheld code reader towards an object on which a machine-readable indicia (e.g., barcode, QR code, direct part marking (DPM) code, etc.) is disposed aligned to a line of sight of reading optics of the code reader such that an image of the machine-readable indicia may be captured by an image sensor thereof. In the case of stationary code readers, a user or machine (e.g., conveyer) typically moves an object on which a machine-readable indicia is disposed into a line-of-sight of optics of the code reader such that an image of the machine-readable indicia may be captured by an image sensor thereof. In either case, motion of the object and machine-readable indicia relative to the code reader causes challenges for the code reader to properly image and decode the machine-readable indicia. As a result of the relative motion, there is a need to quickly identify a machine-readable indicia (e.g., linear barcode), thereby being able to speed up the decoding process. As such, there is a need for improved performance of code readers in more quickly identifying a region-of-interest in which a machine-readable is located on the object.

Conventionally, localization algorithms of two-dimensional (2D) images or image frames that find possible locations of machine-readable indicia based on spatial image properties are used. In performing the localization algorithms, spatial filter kernels are typically applied to a 2D image to find one or more areas of high accumulated contrast. Information that is indicative of the high accumulated contrast is then used by localizers or localization algorithms to define bounding boxes around the machine-readable indicia, such as linear barcodes, and to crop the image discarding parts that do not include a machine-readable indicia. The use of spatial filter kernels, however, may be slow due to being computationally complex.

SUMMARY

To improve performance for a code reader to decode fast-moving targets, localization analysis may be utilized by using an event-based camera or sensor. The localization analysis may include acquiring events, grouping the events to form clusters of events, determine edges based on the clusters, and determine edges that are closely spaced so as to determine that a linear barcode exists. A box may be formed about the linear barcode, while events that are not part of the barcode may be dismissed, thereby increasing speed for decoding the linear barcode as the code reader may focus on a region-of-interest within the box.

One embodiment of a method of identifying a linear barcode may include acquiring multiple events from an event-based camera imaging an object on which a linear barcode is positioned within the scene. The events may be grouped to form clusters of the events. A box may be formed around the linear barcode so as to identify a region-of-interest in which to process the linear barcode for decoding.

One embodiment of a code reader may include an event-based camera configured to capture a plurality of events withing a field-of-view of the code reader. A non-transitory memory may be configured to store captured images. At least one processor may be in communication with the event-based camera and non-transitory memory. The processor(s) may be configured to acquire multiple events from an event-based camera imaging and object on which a linear barcode is positioned within the scene. The events may be grouped to form clusters of the events. A box may be formed around the linear barcode so as to identify a region-of-interest in which to identify the linear barcode for decoding.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
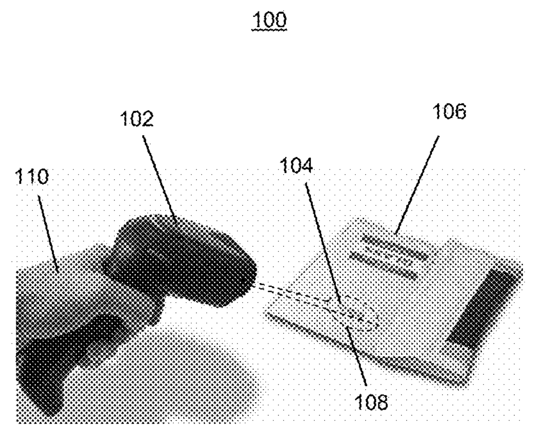
FIG. 1 is an illustration of an illustrative scene in which a handheld code reader may be used to image a machine-readable indicia disposed on an object, such as a parcel.

With regard to FIG. 1, an illustration of an illustrative scene 100 in which a handheld code reader 102 may be used to image a machine-readable indicia 104 disposed on an object 106, in this case a parcel, is shown. The code reader 102 is shown to output an illumination signal 108 that defines a field-of-view (FOV) that encompasses the machine-readable indicia 104 to enable the code reader 102 to image the machine-readable indicia 104. Because the code reader 102 is handheld, there is typically relative motion between the code reader 102 and the machine-readable indicia 104 caused by a user's hand 110 shaking or otherwise moving towards or across the machine-readable indicia 104, for example. As described herein, effects of the relative motion between the code reader 102 and machine-readable indicia 104 disposed on the object 106 may be reduced or eliminated utilizing the principles described herein.

Figure 2:
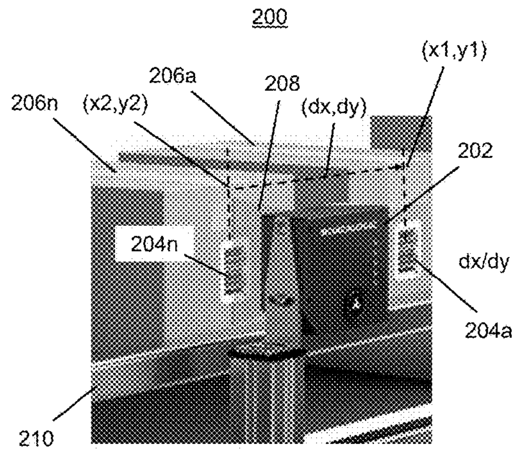
FIG. 2 is an illustration of an illustrative scene in which a fixed position code reader may be used to image machine-readable indicia, in this case linear barcodes, disposed on objects that are being moved past the code reader.

With regard to FIG. 2, an illustration of an illustrative scene 200 in which a fixed position code reader 202 may be used to image machine-readable indicia 204*a*-204*n* (collectively 204) disposed on respective objects 206*a*-206*n* (collectively 206) that are being moved past the code reader 202 is shown. The code reader 202 may output an illumination signal 208 that defines a field-of-view of the code reader 202 within which the machine-readable indicia 204 may be read. The objects 206, which in this case are packages being transported on a conveyor 210, such as a conveyor belt, may pass through the illumination signal 208 of the code reader 202 such that the code reader 202 is able to image and decode the machine-readable indicia 204 affixed to the respective objects 206. Because the objects 206 are moving relative to the code reader 202, a speed, such as (dx, dy), may exist. In this case, the horizontal motion dx may be relatively constant due to being on a conveyor that moves at a constant speed, and the vertical motion dy may be zero or another small amount due to moving on the horizontal conveyor 210. As further described herein, effects of the relative motion between the code reader 102 and machine-readable indicia 104 disposed on the object 106 may be reduced or eliminated utilizing the principles described herein.

Event-based cameras are configured to acquire information from captured images of a scene that are particularly suitable in fields of automation. Event-based sensors of event-based cameras do not provide a complete image, but rather provide sparse information only for pixels that have changed in luminance above or below a configurable threshold, where the configurable threshold may be user configurable and/or automatically configurable. Unlike traditional sensors, event-based cameras are therefore not limited by exposure times and readout times, thereby not being limited to frame rates. In addition, event-based cameras output only pixels that have changed (in a sparse way, with position provided with each pixel as metadata), which is very useful to find edges without additional pre-processing steps.

Event-based cameras can improve performance in automation applications that require object tracking, dimensioning, and identification. In these types of applications, linear barcodes may be present on analyzed objects, such as packages, parcels, products, etc. Having a way to localize the barcodes (and other machine-readable indicia, such as QR codes) using event-based cameras may provide additional functional features to the system. The principles provided herein enable localization of one or more barcodes inside a field-of-view to simplify or case barcode decoding. Once a barcode has been located, the localized information may be limited to a region-of-interest for processing to decode the barcode contained therein using the event-based camera directly or with the assistance of another standard image sensor. In the second case, the image sensor may be activated only when signaled by the event-based camera and a portion of the image can be cropped using localization information provided.

The use of event-based camera frames automatically removes low contrast information because pixels that are not triggered are not analyzed. However, utilizing a process that focuses on clusters of edges representing a linear barcode instead of a using spatial kernels, as conventionally performed, or other moving feature(s) may improve system performance.

Utilizing the principles described herein reduces barcode localization time in systems where an event-based camera sensor is available. The contrast information may be used by a localizer both on a standard image, if a CMOS sensor is also available in the system, or directly on event information. The use of localized information allows for replacing spatial kernels with information more suitable to the event space. As an example, it is possible to count a number of edges with the same or similar angle and within a predefined distance to create an indicator (e.g., box) that identifies one or more zones where a linear barcode code is more likely to be present.

Figure 3:
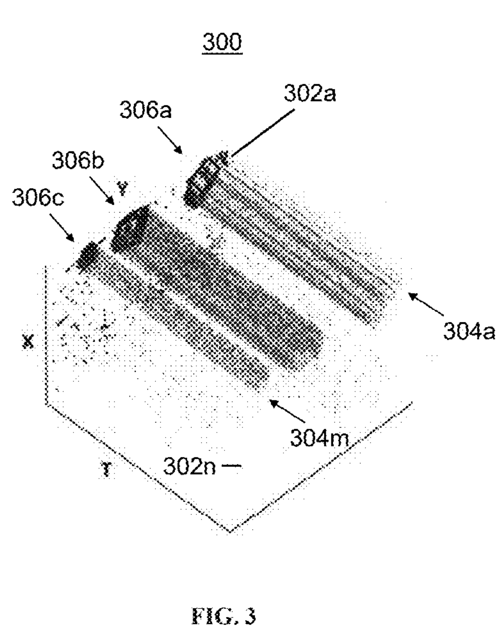
FIG. 3 is a graph showing illustrative events in X, Y, T axes.

With regard to FIG. 3, a graph 300 showing illustrative events 300*a*-302*n* (collectively 302) in X, Y, Taxes is shown. Events from an event-based camera are provided in a sparse way as a combination of position (X, Y), time (T), and edge polarity (P), where an event may be defined as (X, Y, T, P). Edge polarity (P) is defined when a pixel becomes brighter or darker than (i.e., crosses) a predefined brightness threshold level, and may be a binary number so as to be set to a 0 or 1 depending on whether the brightness of a pixel crosses to be above the threshold level or crosses to be below the threshold level. The event information may be used to reconstruct a 2D standard image taking snapshots of the data at specific time intervals (defining a frame rate), or the event information may be used in directly defining a moving time window that is not related to integration time of standard sensors. In both ways, the event information or data may be used to extract useful features of a target object (e.g., edges, boxes, barcodes, dimensions, etc.).

As previously described, event-based cameras may provide information only about changing pixels, so the use of an event-based camera is effectively equivalent to a high pass filter applied to a standard image if a target is moving. Information regarding polarity may be used to determine where an object of different brightness relative to the surroundings is located at a given time.

Continuing with FIG. 3, the events 302 are shown in the X, Y coordinates of the graph 300 over time when polarity (P) of the pixels cross the predefined threshold level, which occurs when pixels transition in brightness due to an object moving relative to the event-based camera. Over time, the events 302 may form lines 304*a*-304*m* (collectively 304), and the relative spacing may be determined to be clusters 306*a*, 306*b*, and 306*c* that may be used to identify as regions-of-interest, optionally positioned within a box that is formed around a region-of-interest, in which linear barcodes (or other machine-readable indicia) may be identified and decoded.

Figure 4:
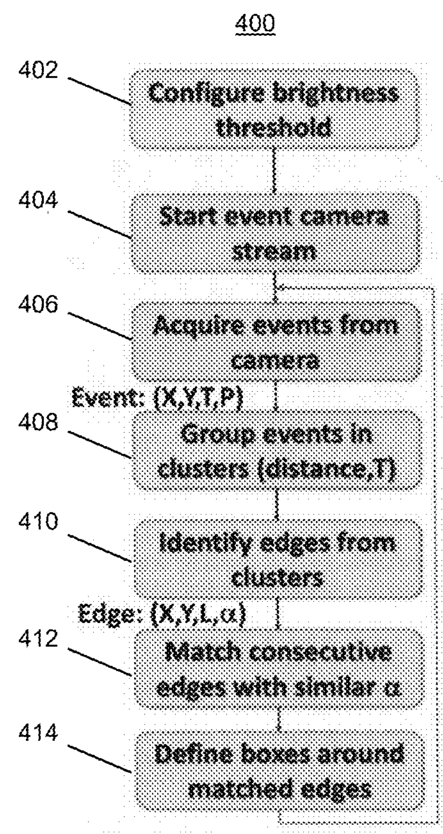
FIG. 4 is a flow diagram of an illustrative process to track and identify linear barcodes and distinguishing the linear barcodes from other features.

With regard to FIG. 4, a flow diagram of an illustrative process 400 to track and identify track linear barcodes and distinguishing the linear barcodes from other features is shown. The process 400 may start at step 402, where a brightness threshold may be configured. The brightness threshold may be set manually or automatically. For example, the event-based camera may be configured based on a test card or other feature (e.g., blank, with a sample linear barcode, with any other image) that results in the event-based camera outputting certain information (e.g., display a brightness level, decode the sample linear barcode, etc.). The brightness threshold may be adjusted up or down by a user depending on results of the sample, as previously described, or automatically. The automatic adjustment may be based on finding a brightness level midway between a brightest level and a darkest level on the test card, for example. The automatic adjustment of the brightness threshold level may be performed in a way that provides a suitable number of events to be processed for the current scene based on number of features. The brightness threshold level may impact a number of factors that may improve timing or speed for identifying the linear barcode, but also may be set to cause the code reader to avoid being overly sensitive and result in false positives, for example, or take too long or miss identifying the barcode. The brightness of a scene may be set to help maintain a constant brightness, but control adjustments may also be made to the event-based sensor and/or illuminator (e.g., gain, duration, etc.).

At step 404, the code reader, which may be configured as an event-based camera with an event-based sensor, may start an event-based stream (see, for example, FIG. 3). Once the event-based camera starts streaming, at step 406, events, where each event may be defined as (X,Y,T,P), from the events-based camera may be acquired. At step 408, events may be grouped in clusters based on distance (spatially) and time (T) (temporally). It is possible to identify clusters by aggregating events that are close to each other both spatially and temporally. In one embodiment, distance may be calculated for all events with an active lifespan considering the Euclidean distance (or the squared distance, which is less computationally intensive) in space (X,Y), such as Dij=(xi−xj)^2+(yi−yj)^2. In another embodiment, distance may be calculated for all the events in the last period of time T considering clusters of events close both in space and time coordinates, as Dij=(xi−xj)^2+(yi−yj)^2 (Ti−Tj)^2. As an example, a distance between events E1=(X1, Y1, T1, P1) and E2=(X2, Y2, T2, P2) may be calculated as E2−E1=D21. If a distance E2−E1<threshold value or level, E2 and E1 may be considered as part of the same cluster. The distance measurements may be performed on a moving time window (e.g., for the last millisecond with respect to current time), thereby not being constrained by standard sensor exposures that are used to create image frames. A time duration of the moving time window may be established either manually or automatically. If manually established, a user may be provided with the ability to set the time duration. If automatically, a process that (i) determines whether too much blur (or other parameter) is occurring or too few events are occurring using a specific test object (e.g., object with a linear barcode printed thereon), and (ii) adjust the time duration to avoid being too long (that causes blur) or too short (to cause events to be missed).

More specifically, a lifespan may be defined for each event. Event Ei is associated with an absolute arrival time Ti. To consider only the relevant events, a lifespan period can be defined. After the lifespan elapses, event Ei may be discarded for all subsequent computations. In this way, events are not accumulated avoiding saturation effects that will make impossible to discriminated between different features. If, during a lifespan of an event, other events are found within a given distance (calculated as previously described), a cluster may be identified (step 408). The cluster has a dedicated lifespan associated therewith. The cluster lifespan may be set with a duration that is compatible with a maximum speed of objects being imaged by a code reader, for example. If the lifespan elapses, the cluster may no longer be related to a current time, but may have contributions at different times (i.e., same edge at different position after a given time). A balance may be found between having enough events and avoiding motion blur effects. If the lifespan period is too short, events will elapse too fast and there will never be enough events active at the same time T to clearly identify features. If the lifespan period is too long, events will accumulate and movement will cause the same feature to be spread too much in the X, Y area. This is similar to motion blur effects in an image sensor, where long exposures will make objects too spread out around the image to clearly discriminate one feature from the others. Once the cluster lifespan elapses, each of the included events may be evaluated to define a shape of the cluster given a set of criteria. If the criteria are not met, the cluster may be discarded. Otherwise, the algorithm continues with a next step of identifying if a cluster is also an edge (step 410).

Possible selection criteria for step 410 may include the following: interpolating event distances with a line and verifying if distance of all events in the cluster (error deviation) is below a given threshold value. To help discriminating between adjacent edges, event polarity (P) may be used, in addition to distance, to understand if empty space is present between events. The empty space may be a gap between edges (e.g., barcode lines) that helps to discriminate between the edges. All events related to the same feature have the same polarity (P) because, for example, a moving black bar from a barcode over a white background triggers events with a negative polarity (e.g., pixels are crossing a threshold between high brightness and low brightness).

Another option to identify the edges is to select a given time interval (from T1 to T2) in a similar way of standard sensor exposure, and work only with events (i.e., process event data) inside the interval to calculate distances. In this way, a high pass filtered image can be generated from events, therefore any algorithm used to identify edges starting from high pass filtered images may be used for this second option. An image may be defined with exposure T2−T1 and all events with Ti inside this time may be accumulated inside the image considering respective spatial positions (X, Y). An image may be reconstructed with only moving features defined by events that are visible therein.

Once a list of edges with comparable timestamps is available, it is possible to calculate an orientation angle for each edge with respect to a predefined coordinate system (step 412), such as defined by orientations of rows and columns of pixels of the event-based camera. Each edge may be identified with starting point (X,Y), orientation angle ($\alpha$) and length (L). Alternative edge identification techniques may be utilized. It should be understood that the list of edges may be partial or complete lengths of lines of a linear barcode.

In an embodiment, a score may be assigned to each pixel based on a number of edges with similar orientation angles that are near each other edge. A possible implementation is to apply a classifier that matches consecutive edges in a cluster (e.g., a total number of edges for particular types of barcodes). In one embodiment, only the edges that are consecutive and have the same or similar orientation angle (e.g., an angle within a given threshold, such as three degrees, may also be determined using normal vectors to each of the edges) may be kept while the other events and/or edges that do not have the same or similar orientation angle (i.e., higher than the angle within the given threshold) may be discarded.

At step 414, boxes may be defined around matched edges (i.e., edges having similar angles and optionally similar lengths). Regions-of-interest with a high number of edges with the same or similar angular orientation may be identified and used to define bounding boxes to define a region in which a high probability of finding linear barcodes may be located. Equivalently, setting a bounding box may be performed and a region-of-interest may be defined therein. This bounding box may therefore be used to simplify a localization phase of decoding algorithms. The boxes may be rectangular or any other shape that bounds the consecutive edges with similar angles that are likely to be determined to be linear barcodes that are being imaged for decoding. The boxes may be angled to substantially match the angle (e.g., within a few degrees) of the consecutive edges. In an embodiment, a partial box may be oriented and constructed as the parallel edges are being formed (e.g., upon a certain length or based on a sequence of parallel events or edges are identified). Upon completion of forming the parallel edges of the linear barcodes. Alternatively, and as previously described, the boxes may be formed after the parallel edges are completed. The process returns to step 406 to further acquire events from the events-based camera.

Figures 5, 6:
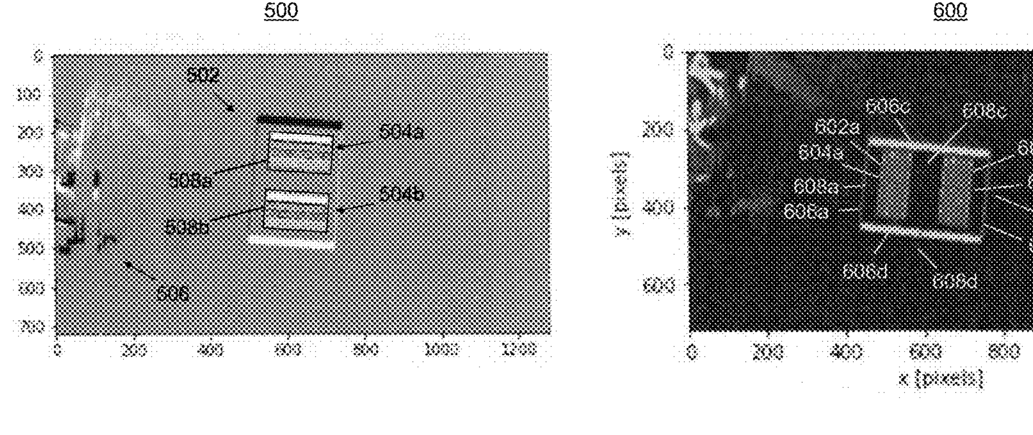
FIG. 5 is an illustration of an illustrative frame representation of events captured with a moving window/snapshot to form a digital representation of an object with linear barcodes.
FIG. 6 is an illustration of an illustrative frame representation of edges with normal vectors (representing angles) produced by an event-based sensor of an event-based camera.

With regard to FIG. 5, an illustration of an illustrative frame representation 500 of events captured with a moving window/snapshot to form a digital representation of an object 502 with linear barcodes 504*a* and 504*b* (collectively 504) is shown. The process 400 may form events, clusters, and edges to be generated to form the digital frame representation of the object 502 based on luminance of pixels crossing a luminance threshold (i.e., crossing below to above or crossing above to below the threshold level). Other features 506 that cause pixels to transition across a luminance threshold level are also shown. The linear barcodes 504 may be detected as a result of matching consecutive edges with the same or similar angles. The process 400 of FIG. 4 may cause boxes 508*a* and 508*b* to be formed around the linear barcodes 504.

With regard to FIG. 6, an illustration of an illustrative frame representation 600 of edges 602*a*-602*n* (collectively 602) with normal vectors (representing angles) 604*a*-604*n* produced by an event-based sensor of an event-based camera is shown. A box defined by edges 606*a*-606*d* (collectively 606) may have corresponding motion vectors 608*a*-608*d* (collectively 608) that shows relative motion of the edges 606 relative to the event-based camera.

In one embodiment, edges with similar orientation may be defined by calculating an orientation angle for each of the edges 602 and 606 with respect to a predefined coordinate system, such as using sensor rows and columns references. After the interpolation phase, edges may be defined in the X, Y reference system as a line defined as $Y=mx+c$. In this case, the orientation angle defined with the X-axis is calculated as $\alpha=1/(\mathrm{Tan}(m))$. In another embodiment, normal vectors for each edge are defined as an alternative way to angles to assess alignment. If the edge is yet again defined as $Y=mX+c$, the associated normal vector is calculated as $n\hat{\ }-1=(-m\ 1)$.

A next step may include assigning a score to each pixel based on a number of edges with similar orientation angles that are near one another. A possible implementation may include defining and applying a classifier that matches consecutive edges in a cluster. In an embodiment, only the edges that are consecutive and have the same or similar orientation angle (e.g., an angle within a given threshold, such as 3-degrees) may be kept while the others may be discarded. In another embodiment, if normal vectors are used instead of angles, cross product may be used to see how well the vectors are aligned. For normalized normal vectors, maximum alignment is when the cross product for two edges equals 1.

In a last step, regions-of-interest with a high number of edges with a similar orientation may be identified and used to define bounding boxes where there is a high probability of finding linear barcodes. The bounding box may therefore be used to simplify a localization phase of decoding algorithms. In one embodiment, the bounding box may be used to form a corresponding region-of-interest in an image sensor available in the system that has a calibrated field-of-view with a defined relationship with the event-based camera field-of-view (this is easier for an event-based sensor stacked with normal image sensors inside the same integrated circuit). In another embodiment, events inside the localization bounding box may be used to recreate a high pass filtered image of the region-of-interest that can be directly used to decode from the event-based camera using standard decoding algorithms.

Figures 7, 8:
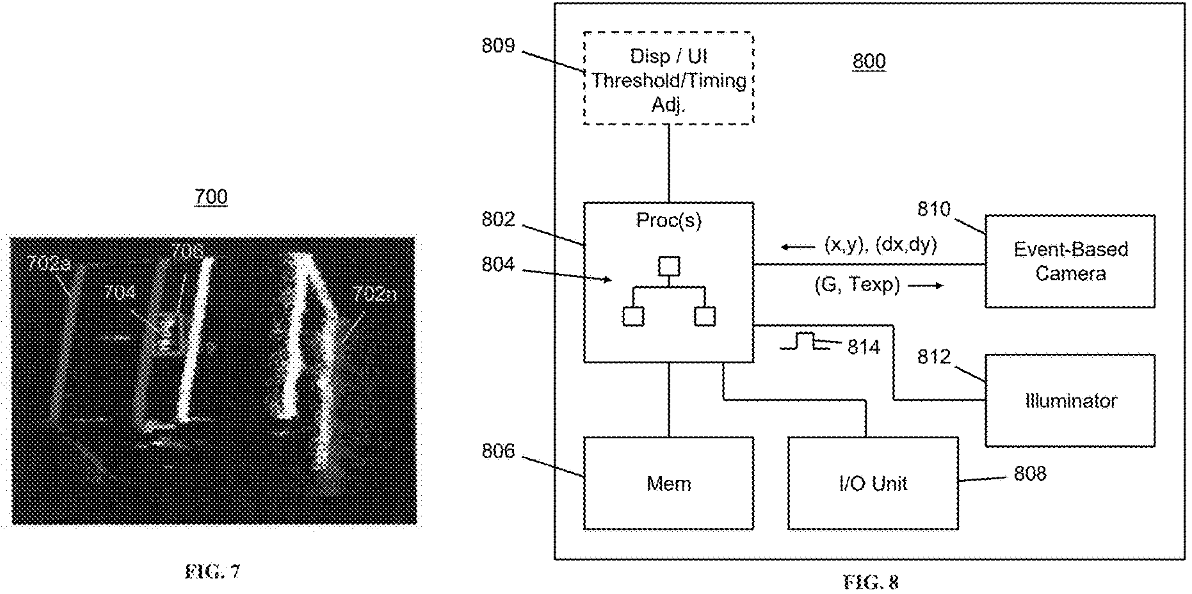
FIG. 7 is an illustration of illustrative frame representation of an object with edges along with a linear barcode being tracked.
FIG. 8 is a block diagram of an illustrative code reader inclusive of hardware that is controlled by software for imaging machine-readable indicia with higher decoding accuracy when there is relative motion between the code reader and machine-readable indicia.

With regard to FIG. 7, an illustration of illustrative frame representation 700 of a representation of an object with edges 702*a*-702*n* (collectively 702) along with a linear barcode 704 being tracked is shown. The linear barcode 704 may be positioned on an object, and other features that result in edges being formed, but do not have other close edges, may be discarded and not tracked. The linear barcode 704 may be identified utilizing the process 400 of FIG. 4 and a box 706 may be formed around the linear barcode 704 with edges being oriented with an orientation of the linear barcode 704. By forming the box 706, rectangular or otherwise, a region-of-interest bounded thereby may thereafter be utilized to identify the barcode 704 for decoding while discarding some or all other edges. Utilizing the principles described herein, faster and more efficient identification and tracking of barcodes may occur.

With regard to FIG. 8, a block diagram of an illustrative code reader 800 inclusive of hardware that is controlled by software for imaging machine-readable indicia with higher decoding accuracy when there is relative motion between the code reader and machine-readable indicia is shown. The code reader 800 (or other system in which a code reader is operating) may include one or more processors 802 that execute software 804 for performing the functionality as described in the process 400 of FIG. 4. The processor(s) 802 may be in communication with a non-transitory memory 806, input/output unit 808, optional electronic display/user interface 809, event-based camera or sensor 810, and illuminator 812. Alternative components and/or processes may be utilized to configure the code readers, such as an external host computer, presetting, or an automatic setting algorithm.

In an embodiment, the software 804 may be configured to determine (e.g., receive from the event-based camera 810) or compute events, group clusters of events, identify edges, match consecutive edges, define boxes around the matched consecutive edges, as previously described with regard to FIG. 4. The software 804 may further be configured to execute decoders and perform other code reading functions, as previously described. In one embodiment, the event-based camera 810 may be an advanced event-based camera that is configured to automatically determine various vectors, which may include stationary points (x,y) and distance vectors (dx,dy), for example, and communicate events, as previously described, and other data to the processor(s) 802 for processing thereby. The memory 806 may be configured to store the events, edges, normal vectors, distance vectors, and so on, thereby enabling the processor to better identify, track, and decode a linear barcode. The software 804 may further be configured to determine event-based camera 810 parameters (e.g., brightness threshold for event generation), which may be communicated to the event-based sensor 810, and illumination pulse duration of an illuminator control signal 814 for controlling the illuminator 812. It should be understood that the code reader 800 may additionally include an image sensor (not shown) in addition to the event-based camera 810 so as to provide for optical imaging, as well. It should be understood that the illuminator control signal 814 may alternatively be a value that is used to set a controller (not shown) of the illuminator 812.

One embodiment of a method of identifying a linear barcode may include acquiring a multiple events from an event-based camera imaging an object on which a linear barcode is positioned within a scene. The events may be grouped to form clusters of the events that identify the linear barcode. A box may be formed around the linear barcode so as to identify a region-of-interest in which to identify the linear barcode for decoding.

Acquiring events from the event camera may include acquiring information indicative of pixels transitioning in luminance above or below a configurable threshold. A user may be enabled to set the configurable threshold. In an embodiment, a user interface may enable the user to set the configurable threshold. Acquiring information may include acquiring spatial and temporal information for each pixel. Acquiring spatial and temporal information may include position (x, y), time (t), and pixel polarity (p), such that each event (E) may be defined by (x, y, t, p).

The process may further include (i) comparing consecutive events within the moving time window, (ii) determining whether successive events are within a threshold distance within the moving time window, and (iii) if consecutive events are within the threshold distance and within the moving time window, adding each of the events to a common edge, otherwise, discarding at least one of the successive events. Acquiring events may include acquiring events within a moving time window. Edges of features may be identified by edges of features from the group events. Consecutive edges with the same or similar angle may be identified, thereby being indicative of the linear barcode.

An orientation angle and length may be calculated for each of the identified edges, thereby enabling identification of consecutive edges with the same or similar angle and lengths. A classifier that matches consecutive edges with the same or similar angles and lengths within a cluster may be defined and applied. In an embodiment, normal vectors to each of the identified edges within each cluster of the events may be determined, and the normal vectors may be utilized to determine that the edges are parallel with one another. Forming a box may include forming a box with four edges, wherein two of the edges may be parallel with the consecutive edges and two of the edges may be perpendicular to the consecutive edges.

One embodiment of a code reader may include an event-based camera configured to capture a plurality of events within a field-of-view of the code reader in a scene. A non-transitory memory may be configured to store captured images. At least one processor may be in communication with the image sensor and non-transitory memory. The processor(s) may be configured to acquire multiple events from an event-based camera imaging and object on which a linear barcode is positioned within the scene. The events may be grouped to form clusters of the events. A box may be defined around the linear barcode so as to identify a region-of-interest in which to identify the linear barcode for decoding.

The processor(s), in acquiring events from the event camera, may be configured to acquire information indicative of pixels transitioning in luminance above or below a configurable threshold. In an embodiment, the configurable threshold may be set by a user via a user interface or otherwise. Alternatively, the configurable threshold may be automatically set based on brightness of a scene, reflectance of barcode edges, or otherwise.

The processor(s), in acquiring information, may be configured to acquire spatial and temporal information for each pixel. The spatial and temporal information may include position (x, y), time (t), and pixel polarity (p), such that each event (E) is defined by (x, y, t, p). The processor(s) may further be configured to (i) compare consecutive events within the moving time window, (ii) determine whether successive events are within a threshold distance within the moving time window, and (iii) if consecutive events are within the threshold distance and within the moving time window, add each of the events to a common edge, otherwise, discard at least one of the successive events. The events may be acquired within a moving time window. The processor(s) may further be configured to identify edges of features by edges of features from the group events, and further identify consecutive edges with the same or similar angle, thereby being indicative of the linear barcode.

The processor(s) may further be configured to calculate an orientation angle and length for each of the identified edges, thereby enabling identification of consecutive edges with the same or similar angle and lengths. A classifier that matches consecutive edges may be defined with the same or similar angles and lengths within a cluster. Normal vectors to each of the identified edges within each cluster of the events may be determined, and the normal vectors may be utilized to determine that the edges are parallel with one another. The box may be defined with four edges, where two of the edges may be parallel with the consecutive edges and two of the edges may be perpendicular to the consecutive edges.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A method of identifying a linear barcode, said method comprising:
- acquiring a plurality of events from an event-based camera imaging an object on which a linear barcode is positioned within a scene;
- grouping the events to form clusters of the events;
- forming a box around the linear barcode so as to identify a region-of-interest in which to identify the linear barcode for decoding;
- determining normal vectors to each of the identified edges within each cluster of the events; and
- utilizing the normal vectors to determine that the edges are parallel with one another.

2. The method according to claim 1, wherein acquiring events from the event camera includes acquiring information indicative of pixels transitioning in luminance above or below a configurable threshold.

3. The method according to claim 2, wherein acquiring information includes acquiring spatial and temporal information for each pixel.

4. The method according to claim 3, wherein acquiring spatial and temporal information includes acquiring spatial and temporal information including position (x, y), time (t), and pixel polarity (p), such that each event (E) is defined by (x, y, t, p).

5. The method according to claim 4, further comprising:
- comparing consecutive events within a moving time window;
- determining whether successive events are within a threshold distance within the moving time window; and
- if consecutive events are within the threshold distance and within the moving time window, adding each of the events to a common edge, otherwise, discarding at least one of the successive events.

6. The method according to claim 5, wherein acquiring events includes acquiring events within the moving time window.

7. The method according to claim 1, further comprising:
- identifying edges of features from the group events; and
- identifying consecutive edges with the same or similar angle, thereby being indicative of the linear barcode.

8. The method according to claim 7, further comprising calculating an orientation angle and length for each of the identified edges, thereby enabling identification of consecutive edges with the same or similar angle and lengths.

9. A method of identifying a linear barcode, said method comprising:
- acquiring a plurality of events from an event-based camera imaging an object on which a linear barcode is positioned within a scene;
- grouping the events to form clusters of the events;
- forming a box around the linear barcode so as to identify a region-of-interest in which to identify the linear barcode for decoding;
- identifying edges of features from the group events;
- identifying consecutive edges with the same or similar angle, thereby being indicative of the linear barcode;
- calculating an orientation angle and length for each of the identified edges, thereby enabling identification of consecutive edges with the same or similar angle and lengths; and
- applying a classifier that matches consecutive edges with the same or similar angles and lengths within a cluster.

10. A code reader, comprising:
- an event-based camera configured to capture a plurality of events within a field-of-view of the code reader in a scene;
- a non-transitory memory configured to store captured images; and
- at least one processor in communication with the image sensor and non-transitory memory, and configured to:
  - acquire a plurality of events from an event-based camera imaging and object on which a linear barcode is positioned within the scene;
  - group the events to form clusters of the events that identify the linear barcode;
  - form a box around the linear barcode so as to identify a region-of-interest in which to identify the linear barcode for decoding;
  - determine normal vectors to each of the identified edges within each cluster of the events; and
  - utilize the normal vectors to determine that the edges are parallel with one another.

11. The code reader according to claim 10, wherein the at least one processor, in acquiring events from the event camera, is configured to acquire information indicative of pixels transitioning in luminance above or below a configurable threshold.

12. The code reader according to claim 11, wherein at least one processor, in acquiring information, is further configured to acquire spatial and temporal information for each pixel, wherein the spatial and temporal information include position (x, y), time (t), and pixel polarity (p), such that each event (E) is defined by (x, y, t, p).

13. The code reader according to claim 12, wherein the at least one processor is further configured to:

compare consecutive events within a moving time window;

determine whether successive events are within a threshold distance within the moving time window; and if consecutive events are within the threshold distance and within the moving time window, add each of the events to a common edge, otherwise, discard at least one of the successive events.

14. The code reader according to claim 13, wherein the at least one processor is further configured to acquire events within the moving time window.

15. The code reader according to claim 14, wherein the at least one processor is further configured to:

identify edges of features from the group events;

identify consecutive edges with the same or similar angle, thereby being indicative of the linear barcode.

16. A code reader comprising:

an event-based camera configured to capture a plurality of events within a field-of-view of the code reader in a scene;

a non-transitory memory configured to store captured images; and at least one processor in communication with the image sensor and non-transitory memory, and configured to:

acquire a plurality of events from an event-based camera imaging and object on which a linear barcode is positioned within the scene;

group the events to form clusters of the events that identify the linear barcode;

form a box around the linear barcode so as to identify a region-of-interest in which to identify the linear barcode for decoding;

identify edges of features from the group events;

identify consecutive edges with the same or similar angle, thereby being indicative of the linear barcode; and calculate an orientation angle and length for each of the identified edges, thereby enabling identification of consecutive edges with the same or similar angle and lengths.

17. The code reader according to claim 16, wherein the at least one processor is further configured to define a classifier that matches consecutive edges with the same or similar angles and lengths within a cluster.

18. The code reader of claim 16, wherein the at least one processor is further configured to assign a score to each pixel based on a number of edges with similar orientation angles that are near one another.

19. The code reader of claim 16, wherein the at least one processor is further configured to track identified edges having the same or similar orientation angles within a predefined threshold, and to discard edges that do not have the same or similar orientation angles within the predefined threshold.

20. The code reader of claim 19, wherein the predefined threshold is three degrees.

* * * * *